United States Patent
Flannaghan et al.

(10) Patent No.: US 7,425,993 B2
(45) Date of Patent: Sep. 16, 2008

(54) VIDEO SIGNAL PROCESSING

(75) Inventors: Barry Flannaghan, Hampshire (GB); Martin Weston, Hampshire (GB)

(73) Assignee: Snell & Wilcox Limited, Hampshire (GB)

( * ) Notice: Subject to any disclaimer, the term of this patent is extended or adjusted under 35 U.S.C. 154(b) by 512 days.

(21) Appl. No.: 10/516,068

(22) PCT Filed: May 29, 2003

(86) PCT No.: PCT/GB03/02348

§ 371 (c)(1),
(2), (4) Date: Nov. 16, 2005

(87) PCT Pub. No.: WO03/103274

PCT Pub. Date: Dec. 11, 2003

(65) Prior Publication Data

US 2006/0087589 A1   Apr. 27, 2006

(30) Foreign Application Priority Data

May 29, 2002   (GB) ................... 0212430.3

(51) Int. Cl.
*H04N 5/04* (2006.01)
(52) U.S. Cl. ....................... 348/572; 348/537
(58) Field of Classification Search ............... 348/572, 348/573, 536, 537, 538, 500; 341/126, 155; *H04N 5/04*
See application file for complete search history.

(56) References Cited

U.S. PATENT DOCUMENTS

| | | | |
|---|---|---|---|
| 4,731,646 A | 3/1988 | Kliem | |
| 5,062,005 A | 10/1991 | Kitaura et al. | |
| 5,150,201 A | 9/1992 | Mehrgardt et al. | |
| 5,280,352 A | 1/1994 | Herrmann | |
| 5,841,480 A * | 11/1998 | Rhodes | 348/459 |
| 6,100,661 A | 8/2000 | Stessen et al. | |
| 6,297,849 B1 | 10/2001 | Stessen et al. | |
| 6,323,913 B1 * | 11/2001 | Prange | 348/566 |

FOREIGN PATENT DOCUMENTS

| | | |
|---|---|---|
| EP | 0 477 823 | 9/1991 |
| EP | 0 865 198 | 9/1998 |
| WO | WO 03103274 A1 | 12/2003 |

OTHER PUBLICATIONS

International Search Report for Application No. PCT/GB 03/02348.

* cited by examiner

*Primary Examiner*—Sherrie Hsia
(74) *Attorney, Agent, or Firm*—Pearl Cohen Zedek Latzer, LLP

(57) ABSTRACT

A method of generating an orthogonally sampled video signal based on a line phase measure. In a first aspect the input signal is sampled by a clock locked to the average line frequency of a video input and the resulting samples are time shifted, optionally with or without interpolation, to an orthogonal sampling grid. In a second aspect input samples are taken and shifted to an orthogonal sampling grid according to a line phase measure. The line phase measure can be derived from a number of measurements or interpolated. In one embodiment a delay is employed so that a measure of a later sample is used to shift an earlier sample.

26 Claims, 2 Drawing Sheets

Video ADC System

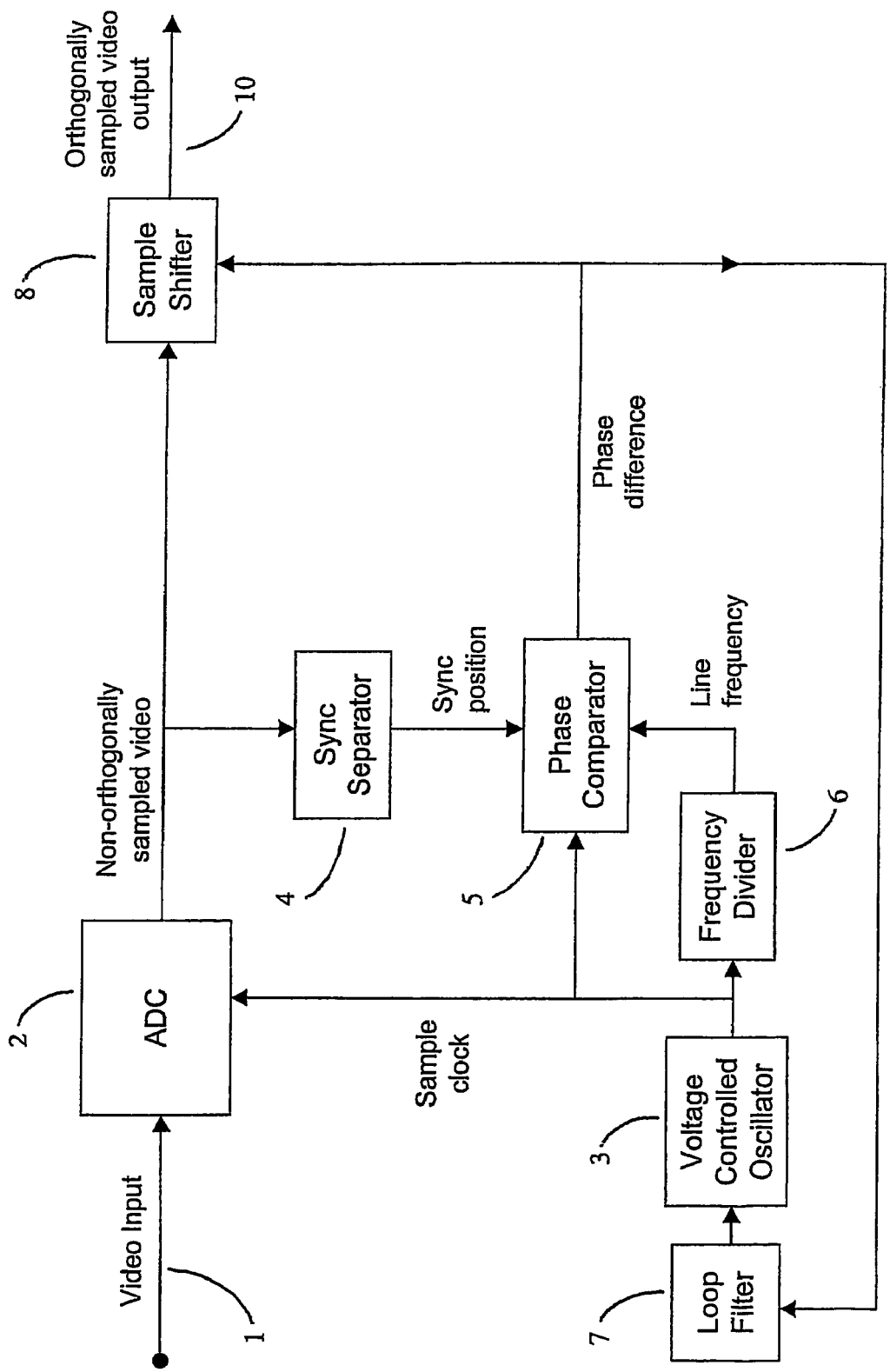
Figure 1: Video ADC System

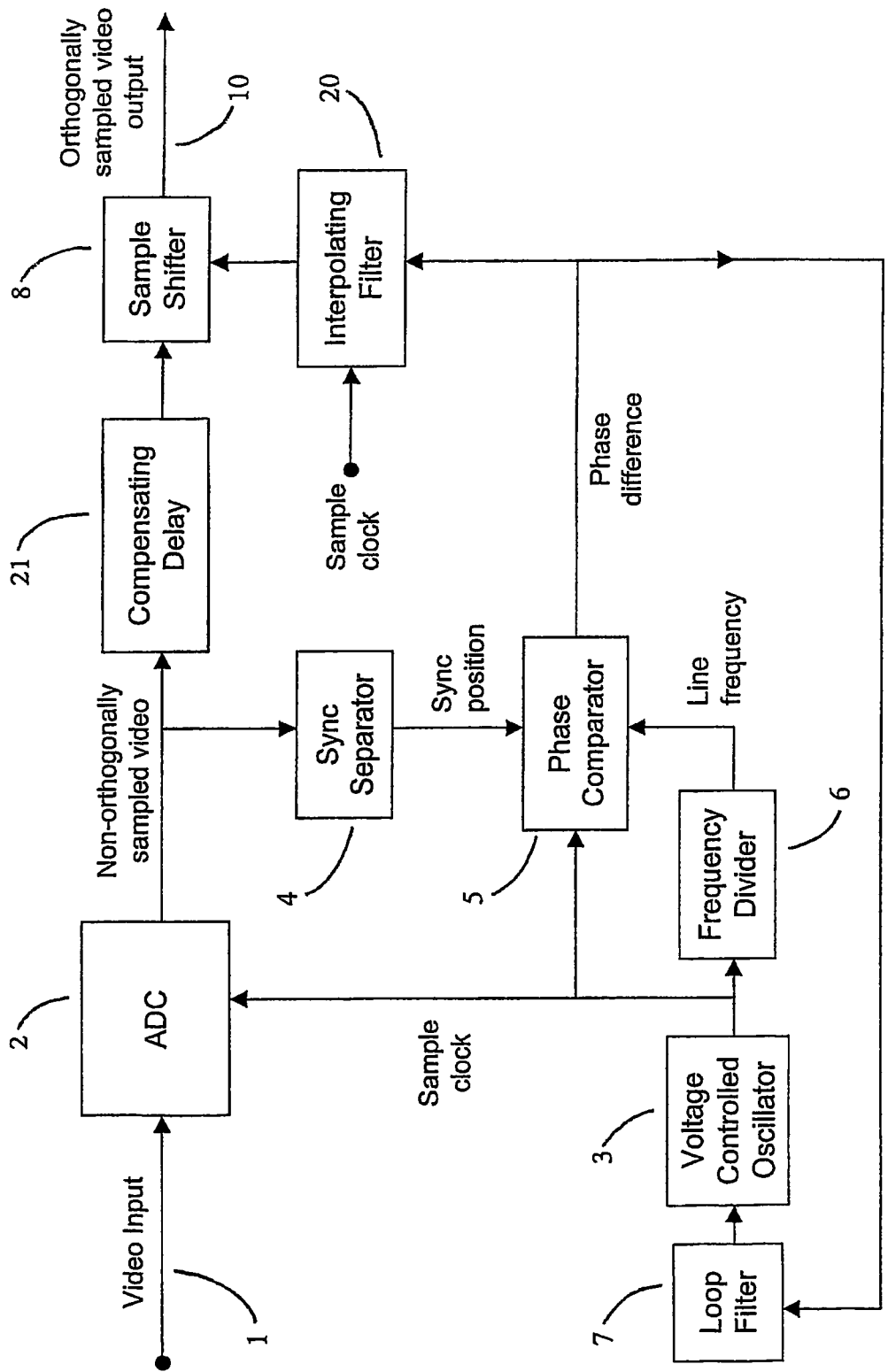
Figure 2: Video ADC System with Sample Phase Prediction

VIDEO SIGNAL PROCESSING

CROSS-REFERENCE TO RELATED APPLICATIONS

This application is a National Phase Application of PCT International Application No. PCT/GB03/02348, International Filing Date May 29, 2003, entitled "VIDEO SIGNAL PROCESSING", which in turn claims priority from Great Britain Patent Application, 0212430.3, filed May 29, 2002, which are both incorporated by reference herein in their entirety.

FIELD OF THE INVENTION

This invention concerns the sampling or re-sampling of television signals to achieve an orthogonal sample structure.

BACKGROUND OF THE INVENTION

Since the adoption of ITU/CCIR Recommendation 601 the digital processing of television signals has almost always been carried out with an orthogonal sampling structure. However, there are applications in which it is difficult to convert the signal into this form; a well-known example is the processing of the output of a domestic video cassette recorder. In this case the instability of the line frequency makes it difficult to derive an orthogonal sampling grid.

In order to sample an analogue television signal orthogonally, it is necessary to derive a repetitive sampling clock signal which defines the instants at which the signal is to be digitised. If the signal were stable these instants would be regular, and the clock would be an integral multiple of the signal's line frequency. In the case of an unstable signal the timing of the clock pulses must vary, so that the same number of samples is taken on every line, even though all lines are not of the same duration.

One known method of doing this is to use a high-bandwidth (of the order of 1 khz), frequency-agile phase locked loop to derive the clock. The clock oscillator attempts to follow the signal's varying line frequency and so maintain the same number of samples on every line. This is difficult to achieve; one problem is that the wide-bandwidth loop is more susceptible to noise than a narrow-band loop would be. Another problem is that if the loop is capable of operating over a wide frequency range it is less able to phase-lock accurately because of practical limitations to the resolution of the control signal.

A second known method is to sample the signal with a stable, free-running sampling clock and then process the resulting non-orthogonal samples to obtain orthogonal samples. This is done by the horizontal interpolation of new sample values from the actual samples taken. This interpolation corresponds to a filtering process which modifies the frequency response of the sampled signal; if a flat response is required a large number of input samples need to be used to generate each interpolated output sample.

SUMMARY OF THE INVENTION

The invention seeks to overcome these difficulties of the known methods and to provide a technique for obtaining orthogonally-sampled digital video from both stable and unstable source material.

The invention consists, in one aspect, of a method of generating an orthogonally sampled video signal, in which the signal is sampled by a substantially constant frequency sampling clock locked to the average line frequency of the video signal, and the resulting samples are shifted to an orthogonal sampling grid.

Preferably the samples are shifted without interpolation between samples when the instantaneous input line frequency is equal to the average input line frequency.

Suitably no more than three input samples are used to generate an output sample.

Advantageously the required sample shift is derived from a line phase measure, characterised in that the measurement is made in integer sample interval units and interpolated to a precision corresponding to a fraction of a sample interval.

In an alternative embodiment the samples are delayed prior to shifting so that a line phase measure corresponding to the phase of a later sample, is used to calculate the required shift for an earlier sample.

In a further aspect of the invention there is provided a method of generating an orthogonally sampled video signal in which the signal is sampled by a sampling clock and the resulting samples are shifted to an orthogonal sampling grid, wherein the required sample shift is derived from a line phase measure.

BRIEF DESCRIPTION OF THE DRAWINGS

Two examples of the invention will now be described with reference to the drawings in which:

FIG. 1 is a diagram illustrating a video ADC system in accordance with an embodiment of the invention; and FIG. 2 is a diagram illustrating a video ADC system in accordance with another embodiment of the invention.

DETAILED DESCRIPTION OF THE INVENTION

Referring to FIG. 1, an analogue video input signal (1) is applied to an analogue-to-digital converter (ADC) (2). The sampling clock for this converter is obtained from a stable, voltage-controlled oscillator (3), whose nominal frequency is an integral multiple of the nominal line frequency of the input (1).

The output samples from the ADC (2) are passed to a digital sync-separator (4) which calculates, to sub-sample accuracy, the position of the horizontal timing reference point (normally the mid-point of the leading edge of the line sync pulse) of each line of the input video signal (1) with respect to the sampling clock from the oscillator (3). A sync phase comparator (5) derives the phase of the detected timing reference point relative to a line frequency signal obtained by dividing (6) the sampling clock frequency by the required number of orthogonal samples per line. The phase difference output of this comparator would typically be expressed as the sum of an integer number of clock samples and a fraction of a sampling period.

The output of the phase comparator (5) is used for two different purposes. Firstly, the phase difference is low pass filtered by a loop filter (7) and used to control the frequency of the oscillator (3). The closed-loop bandwidth of the control loop is low, typically in the range 0.1 to 50 Hz, and so, for stable input signals, the sampling structure will be orthogonal and accurately phased to the horizontal time reference point. In the case of an unstable input the samples will not be orthogonal, but the average number of samples per line will be a multiple of the average input line frequency.

Secondly, the output from the phase comparator (5) controls a sample shifter (8) which converts the non-orthogonal samples from the ADC (2) into an orthogonally sampled output (10). (The phase comparator output may be filtered or temporally up-sampled as will be explained later.)

The sample shifter (8) must be able to shift samples by the maximum phase error between the stable line frequency signal from the divider (6) and the input line frequency. Methods of shifting by an integer number of samples are well known, typically a buffer memory may be used. Provision is also made for shifting the samples by a fraction of a sampling interval. As has been mentioned in the introduction to this specification, it is complicated to do this while maintaining a good frequency response. In the invention a very simple interpolator can be used; typically only two consecutive input samples are used to derive an output sample lying between them. This simplification is possible because the phase control loop for the oscillator (3) is designed so that, for stable inputs, the fractional part of the output of the comparator (5) is zero and so no Interpolation (and no consequent distortion) occurs to such inputs. The inventors have appreciated that unstable video signals (such as those from VHS playback) most commonly have existing distortion (such a reduced frequency response) and thus the additional distortion due to low-order interpolation will be insignificant, and not apparent to the viewer.

In an embodiment, there is some thresholding employed in the shifting circuit, such as a coring function, in order to ensure that for very low phase differences, no interpolation at all is performed. In such cases, the error in the output introduced by interpolating is greater than that introduced by not interpolating (and thus not shifting samples to exactly the "correct" location).

As mentioned above the output from the comparator (5) can be processed to obtain further benefits; these further embodiments of the invention will now be described with reference to FIG. 2, which shows a modification of the system of FIG. 1 in which elements which are common to FIG. 1 have the same reference numerals.

The phase comparator (5) can only produce an output once per input line sync pulse; however, the phase relationship between the sampling clock from the oscillator (3) and an ideal orthogonal sampling structure may be continually changing and, ideally, the control signal to the sample shifter (8) should follow the changes so that each sample is correctly shifted to an-orthogonal position. Acceptable results can be obtained by using the same shift for all the samples of one output line, but visible picture width changes may occur as the input line frequency changes.

FIG. 2 shows an interpolating filter (20) between the comparator (5) and the sample shifter (8) this "up-samples" the once-per-line output from the comparator to give a new shift value for each sample.

The interpolating filter may also be used to increase the resolution of the control signal; for example, only the integer part of the phase error could be input to the filter (20) whereas the filter output could have a much higher resolution, typically five fractional-significance bits. If there is some dither on the phase measurement, perhaps due to sync noise or even the changing value of the actual phase error, then increased phase resolution will be obtained. This use of several phase error measurements to give a more accurate estimate of the error may be used alone, or in combination with the up-sampling feature of the filter.

As well as lacking temporal resolution, the output from the comparator (5) is inherently "backward looking"; it has no knowledge of the future. This deficiency can be overcome be inserting a compensating delay (21) in series with the video input to the sample shifter (8). This delay can be chosen in conjunction with the interpolation characteristic of the filter (21) so that the shift value applied to a particular sample is derived taking into account the phase of samples within a filter aperture extending before and after the current sample.

The design of the filter (20) should be optimised to achieve the best prediction of the required sample shift and rejection of sync noise, taking into account expected video characteristics due to such factors as tape transport dynamics and head-switching transients. The filter may, for example, have non-linear characteristics.

Various other implementations of the basic concept will be apparent to those skilled in the art, for example separate phase comparators could be used for deriving the oscillator control signal and the interpolator control signal, each optimised for its particular application. The oscillator control loop may have a non-linear amplitude characteristic to minimise the phase error for stable signals. Though embodiments of the invention have been described with analogue input, others may be implemented with digital input where the sampling operation of the ADC is replaced by a digital re-sampling operation.

The invention claimed is:

1. A method of sampling an input video signal to produce an orthogonally sampled video signal comprising:
   sampling the input video signal using a sampling clock;
   taking a plurality of line phase measures of the video signal; and
   shifting the resulting samples to an orthogonal sampling grid;
   wherein the required sample shift is derived from more than one line phase measure.

2. A method according to claim 1, wherein the line phase measures are filtered to produce interpolated phase measurements having an increased temporal resolution.

3. A method according to claim 2, wherein said filtering is non-linear.

4. A method according to claim 1, wherein the line phase measures are filtered to produce phase measurements having an increased numerical resolution.

5. A method according to claim 4, wherein said filtering is non-linear.

6. A method according to claim 1, wherein measures are made in integer sample interval units.

7. A method according to claim 1, wherein measures are interpolated to a precision corresponding to a fraction of a sample interval.

8. A method according to claim 1, wherein the samples are delayed prior to shifting so that a line phase measure corresponding to the phase of a later sample is used to calculate the required shift for an earlier sample.

9. A method of sampling an input video signal to produce an orthogonally sampled video signal comprising:
   sampling the input video signal using a sampling clock locked to the average line frequency of the video signal; and
   shifting the resulting samples to an orthogonal sampling grid.

10. A method according to claim 9 in which the samples are shifted without interpolation between samples when the instantaneous input line frequency is equal to the average input line frequency.

11. A method according to claim 9 where the samples are shifted by fractions of a sampling interval and no more than three input samples are used to interpolate an output sample.

12. A method according to claim 9 in which the required sample shift is derived from a line phase measure.

13. A method according to claim 12, wherein the shift is derived from a plurality of line phase measures.

14. A method according to claim 12, wherein measures are made in integer sample interval units.

15. A method according to claim 14, wherein measurements are interpolated to a precision corresponding to a fraction of a sample interval.

16. A method according to claim 11, in which the samples are delayed prior to shifting so that a measure of a later sample is used to calculate the required shift for an earlier sample.

17. A method according to claim 16, wherein the measure is a line phase measure corresponding to the phase of the later sample.

18. A method of sampling an input video signal to produce an orthogonally sampled video signal comprising:
   sampling the input video signal using a sampling clock;
   delaying the sampled signal; and
   shifting the delayed samples to an orthogonal sampling grid;
   wherein the samples are delayed so that a line phase measure corresponding to the phase of a later sample is used to calculate the required shift for an earlier sample.

19. Apparatus for shifting samples of a sampled video signal comprising:
   a sample shifter capable of shifting samples under the control of a shift control signal;
   a line phase measurement unit operating on the sampled video signal to derive a measure of the input line phase;
   a filter adapted to receive a plurality of line phase measures, and to output a shift control signal to the sample shifter based on said plurality of line phase measures; and
   wherein the sample shifter uses the shift control signal to output samples to an orthogonal sampling grid.

20. Apparatus according to claim 19, wherein said filter produces interpolated shift values having a temporal resolution greater than the temporal resolution of the line phase measures.

21. Apparatus according to claim 19, wherein said filter produces shift values having a numerical resolution greater than the numerical resolution of the line phase measures.

22. Apparatus according to claim 19, wherein line phase measurements are made to integer input sample interval accuracy.

23. Apparatus according to claim 22, wherein said filter produces shift values to a precision corresponding to a fraction of an input sample interval.

24. Apparatus according to claim 19, further comprising a delay acting on the sample shifter input, such that a line phase measure corresponding to a later sample is used to calculate the shift for an earlier sample.

25. Apparatus according to claim 19, wherein output samples are shifted without interpolation.

26. Apparatus for shifting samples of a sampled video signal comprising:
   a sample shifter capable of shifting samples under the control of a shift control signal;
   a line phase measurement unit operating on the sampled video signal to derive a measure of the input line phase and to output a shift control signal to the sample shifter based on a line phase measure;
a delay acting on the sample shifter input, such that a line phase measure corresponding to a later sample is used to calculate the shift for an earlier sample;
and wherein the sample shifter uses the shift control signal to output samples to an orthogonal sampling grid.

* * * * *